Patented Nov. 12, 1935

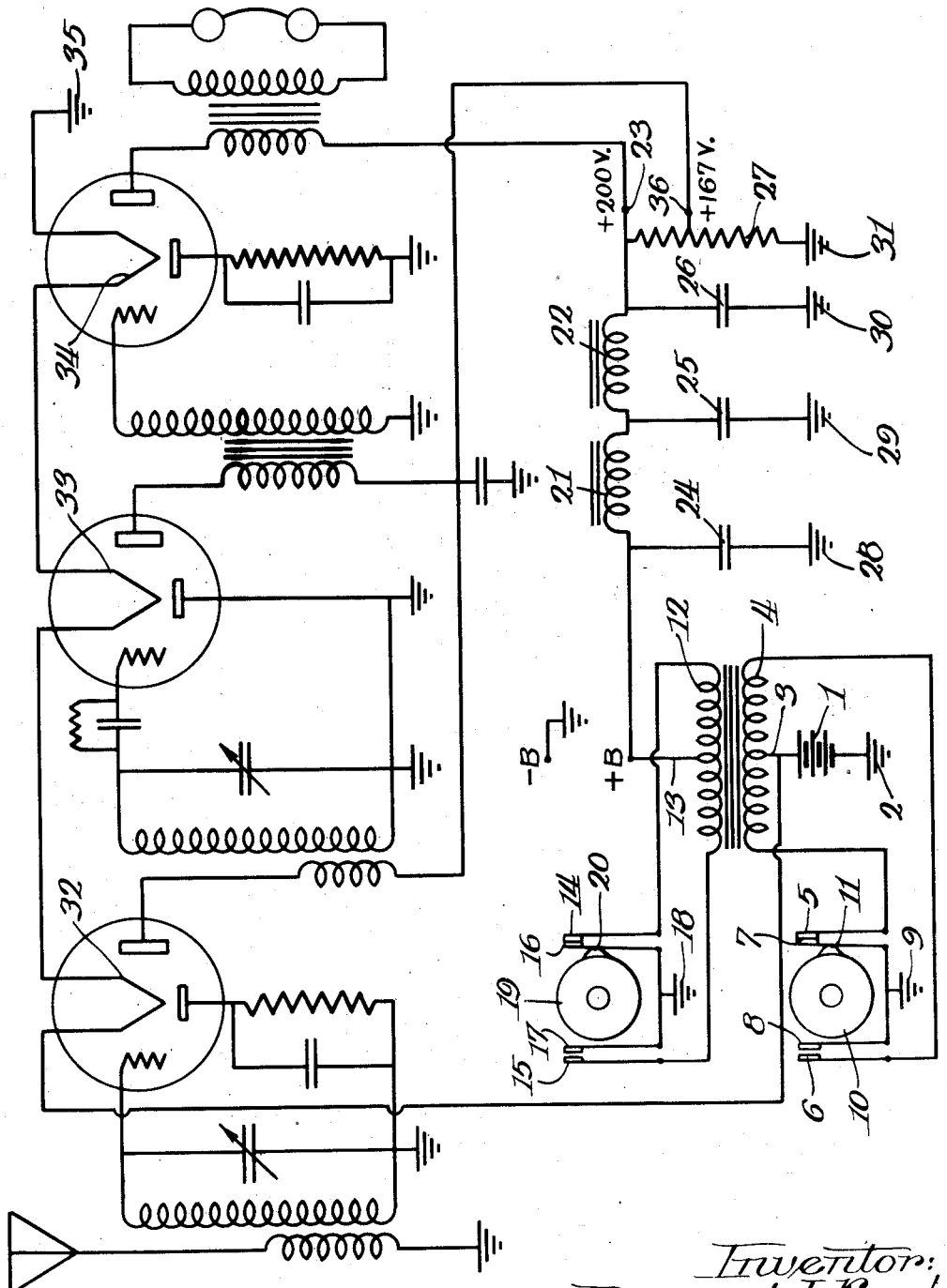

2,020,362

UNITED STATES PATENT OFFICE 2,020,362

ELECTRIC CURRENT CONVERTER

Raymond J. Keogh, Chicago, Ill., assignor of one-half to Walter H. Huth and one-fourth to William J. Morey, both of Chicago, Ill.

Substitute for abandoned application Serial No. 423,591, January 27, 1930. This application February 7, 1935, Serial No. 5,439

7 Claims. (Cl. 171—97)

This invention relates to apparatus for converting alternating current into direct current, and more particularly to apparatus for converting direct current, such as storage battery current, into alternating current, and then into direct current suitable for use in various ways, such as for the purpose of operating a radio receiving set.

Generally stated, therefore, the object of the invention is to provide a novel and improved arrangement involving, preferably, an interrupter and a transformer for converting a direct current of relatively low potential, such as a storage battery current, suitable, for the filament potential of a radio receiving set, into an alternating current, in combination with rectifier means for converting the alternating current into a direct current of relatively high potential suitable for use as the plate potential in a radio receiving set, or for other purposes, mechanical means being employed for opening and closing movable contacts in the input and output circuits of the transformer, whereby all rotary parts are excluded from the circuits, thereby tending to insure a more satisfactory action of said circuit controlling contacts, and whereby all rotary elements are excluded from the plate circuit of the receiving set.

It is also an object to provide certain details and features of construction and combinations tending to increase the general efficiency and the desirability of a current converter apparatus of this particular character.

To these and other useful ends, the invention consists in matters hereinafter set forth and claimed and shown in the accompanying drawing, in which the single figure is a diagram of a current transformer and converter apparatus involving the principles of the invention.

As thus illustrated, the invention comprises a battery 1, which may be a storage battery of an automobile, or aeroplane, or motor boat, or any other source of direct current. This battery has one pole grounded at 2, and its other pole is connected by a tap 3 to an intermediate point on the primary 4 of a transformer. One terminal of the primary 4 is connected to the stationary conductor 5, while the other terminal of this primary winding is connected to the stationary contact 6, as shown. The two movable contacts 7 and 8, allotted, respectively, to the stationary contacts 5 and 6, are electrically connected together and grounded at 9, as shown. A rotary disk 10 is provided with a cam portion 11 of insulating material for engaging first one contact 7, and then the other contact 8, whereby a circuit is first closed through one section of the primary 4, and then through the other section thereof, thus alternately including first one part of the primary winding and then the other, in circuit with the battery 1, previously mentioned. In this way, the effect of the input from the battery 1 into the transformer is an alternating current in the transformer, with the well known effect in the secondary of the transformer.

Therefore, the said secondary 12 of said transformer preferably has a middle tap 13 thereto, or a connection to an intermediate part of this secondary, while the opposite terminals of the secondary are connected, respectively, with the stationary contacts 14 and 15 of the rotary converter mechanism. The two movable contacts 16 and 17, allotted, respectively, to the stationary contacts 14 and 15, are electrically connected together and grounded at 18, as shown. The rotary disk 19 has a cam portion 20 of insulating material for engaging first one contact 16, and then the other contact 17, thus alternately closing the circuit of the two sections or parts of the secondary 12, previously mentioned. The middle tap 13 is connected through inductance or choke coils 21 and 22 with the terminal 23, and also through condensers 24, 25 and 26, and the resistance coil 27, to the grounded points 28, 29, 30, and 31, as shown. With this arrangement, the output from the transformer is a pulsating direct current, but this pulsating current is flattened out or modified to a continuous direct current in the output circuit, which latter includes the ground 18 and the ground 31, previously mentioned.

Inasmuch as there are no rotary parts in electrical circuits, the opening and closing action of the contacts controlling the input and output circuits of the transformer is more satisfactory, as, for one thing, it tends to prevent sparking at these contacts.

Thus, a storage battery or other source of direct current is provided to provide a primary source of current, and the direct current therefrom is converted into an alternating current in the transformer, and by means of the latter, the output direct current is of the desired potential and character. In this way, any suitable apparatus, such as the radio receiving set shown in the upper portion of the drawing, may be operated from a single source of direct current. As shown, the filaments 32, 33 and 34 of the three tubes are connected in series and grounded at 35 and connected through the battery 1 to the ground 2, previously mentioned, whereby the filaments are heated in series by current from the battery. On the other hand, the plate of the third tube derives its potential from the terminal point 23, previously mentioned, whereby the output circuit of this tube is operated by current from the output circuit of the transformer; while the plates of the first and second tubes derive their potential from the terminal point 36, which latter is in turn connected to an intermediate point on the resistance 27, previously mentioned.

It will be understood that the two disks 10 and 19 can be operated by an electric motor (not shown) or any other suitable power device, and that these disks are timed in their operation to produce the converter and transformer effect previously described.

There are different uses for the invention, of course, but in the operation of a radio set on an automobile, from the ordinary storage battery of the car, in the manner shown and described, the modus operandi includes the stepping up of the low potential battery current to a higher potential current suitable for the plate potential of a radio set, whereby a low potential current source becomes available not only for its ordinary uses, as on the automobile, but also for the plate potential of the radio set.

It will be seen that this is an improvement on the structure and circuit arrangement disclosed in United States Patent No. 1,935,568, granted November 14, 1933, in which the feature of using the same source of current for both the filament and plate potentials of a radio receiving set, as by using an automobile storage battery for that purpose, with the low potential of the battery dividing the filament potential, and a converter being employed for stepping up the current from said battery to a higher potential for the plates of the receiving set, is claimed broadly, whereby this application is subordinate to said patent.

What I claim as my invention is:

1. In an apparatus for deriving a direct current of given potential from a source of direct current of different potential, the combination of a source of relatively low potential direct current, a transformer having primary and secondary windings, with a current feed middle tap to said primary from said source, means whereby the input of current from said source to said transformer is in effect an alternating current in said secondary and means whereby the ultimate output from said transformer secondary is a relatively high potential direct current, both of said means including spring switch means operated by rotary mechanical instrumentalities for causing the opening and closing of the input and output circuits of said transformer, but all rotary mechanical elements thereof being excluded from said input and output circuits.

2. A structure as specified in claim 1, said transformer secondary being divided by a middle tap thereto, whereby the two sections of the secondary are alternately included in the high potential output circuit, with a make and break device for insertion with each section, and a single rotary element for alternately actuating both devices.

3. A structure as specified in claim 1, said transformer primary being divided by an intermediate tap thereto, whereby the two sections of the primary are alternately included in the low potential input circuit, with a make and break device for insertion with each section, and a single rotary element for alternately actuating both devices.

4. A structure as specified in claim 1, said instrumentalities comprising a plurality of rotary members provided with cam portions and insulation, together with movable circuit controlling contacts operated by said excluded cam portions.

5. A structure as specified in claim 1, comprising a radio receiving set provided with a filament circuit deriving relatively low potential current from said source, and having a plate circuit energized by the relatively high potential current output from the secondary, whereby all of said rotary mechanical elements are excluded from the plate circuit.

6. A structure as specified in claim 1, comprising a radio receiving set having a filament circuit deriving relatively low potential current directly from said source, and having a plate circuit provided with a middle tap to the secondary, said instrumentalities having means for alternately including the two sections of the secondary in the plate circuit, whereby said plate circuit is energized by the relatively high potential current output from said transformer, and whereby all of said rotary mechanical elements are excluded from the plate circuits.

7. A structure as specified in claim 1, said secondary being divided and having a middle tap forming a high potential output circuit.

RAYMOND J. KEOGH.